Dec. 25, 1951 G. G. BROWN 2,579,470
SELECTOR SYSTEM
Filed Sept. 7, 1946
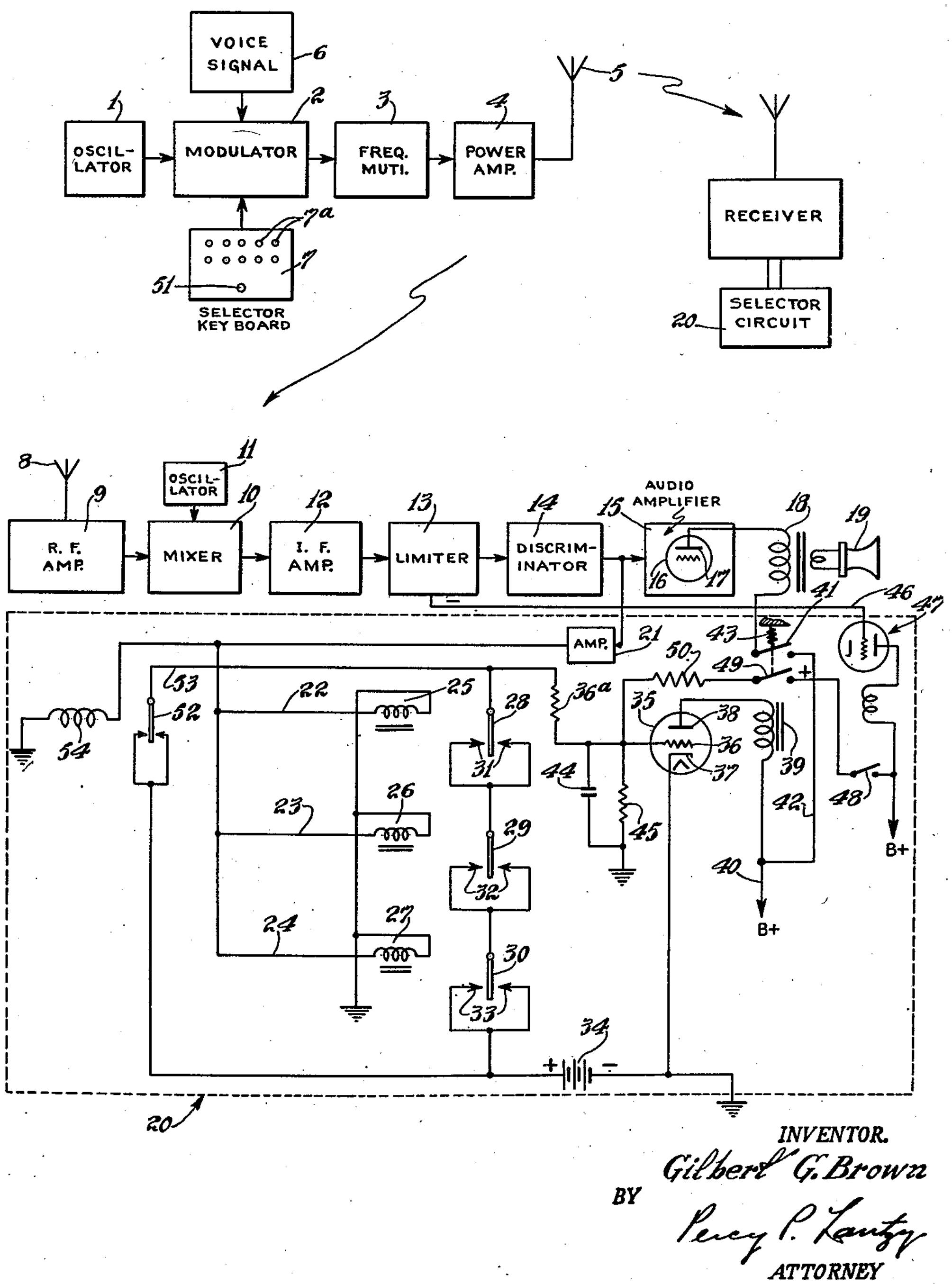
INVENTOR.
Gilbert G. Brown
BY Percy P. Lantzy
ATTORNEY Patented Dec. 25, 1951 2,579,470

UNITED STATES PATENT OFFICE 2,579,470

SELECTOR SYSTEM

Gilbert G. Brown, Orange, N. J., assignor to Federal Telephone and Radio Corporation, New York, N. Y., a corporation of Delaware Application September 7, 1946, Serial No. 695,578

3 Claims. (Cl. 250—2)

This invention relates to systems for selectively controlling the operation of devices and more particularly for selectively calling stations into operation in a communication system having a number of such stations.

One object is to provide means to call into operation a particular desired station or device; and in a preferred embodiment to put it into operating relation with the calling station. Another object is to provide means to selectively control the operation of a plurality of devices or receiving stations and to control the period of operation thereof. Still another object is to provide a selective calling or controlling system which is relatively simple and relatively inexpensive to manufacture.

According to a system of communication between a central station and any of a number of outlying stations, a common frequency channel has been used for transmitting to all of the stations, the signals being transmitted by any desired type of modulation. Such a system may be used, for example, in police communications, communications with taxi cabs, trucks, buses, etc., and for other similar services, to call a desired one of a number of remote mobile or field stations from a central control station.

Since the same frequency channel is used to call from the central station to all the other stations, it is desired that some means for calling and selecting the called station shall be used to put the called station into operating relation with the calling station.

According to my invention, I accomplish this by the provision at each remote or field station, of a number of vibratory elements, each being adapted to be set into vibration by a particular signal or calling frequency. By transmitting from the central station simultaneously those frequencies which are required to operate the vibratory elements at a given field station, a control circuit associated with the vibrating elements is caused to operate an electron discharge tube to render the receiver at the called station operative. Means are also provided whereby a particular signal frequency will operate the control circuit of all receiving stations for simultaneous communication therewith.

Once a receiver is called into operation, the receiver is maintained in operation by a voltage developed by the carrier frequency, and terminated preferably by termination of the carrier frequency at the central station.

The foregoing and other objects and features of my invention will be more thoroughly understood from the following detailed description and the accompanying drawing which shows a system embodying my invention.

In the drawing the sole figure thereof shows a complete system embodying my invention, the system comprising a central calling station and a plurality of mobile or field stations adapted to be called selectively.

The central station is substantially a conventional form of frequency modulation transmitter, comprising an oscillator 1 connected to the input of a modulator 2, the output of which is connected to a frequency multiplier 3 and thence to a power amplifier 4 which is connected to a radiating antenna 5. According to conventional practice, some form of a voice pickup device 6 is connected to the modulator. For the purpose of producing a combination of signal or call frequencies such as the frequencies $f_1$, $f_2$ and $f_3$, for example, there is provided a frequency or station selector which preferably includes a keyboard having a number of frequency selector keys *7a*, each key serving to impress on the modulator 2 a different one of the signal frequencies. Thus, to transmit the signal frequencies $f_1$, $f_2$ and $f_3$, the keys corresponding to those frequencies will be pushed in at substantially the same instance; and the frequency channel modulated by these call frequencies, will be transmitted. The particular grouping of the signal frequencies may be controlled by single keys, that is, one key may be provided to impress frequencies $f_1$, $f_2$ and $f_3$ simultaneously on the modulator 7.

Two of the field or mobile stations, "Mobile Station No. 1" and "Mobile Station No. 2" are shown in the drawing. Each of the mobile stations will ordinarily be composed of the same elements, and accordingly it will only be necessary to describe one of them. Thus, mobile station 1 comprises a receiving antenna 8, a radio frequency amplifier 9, a mixer 10, an oscillator 11 connected to the mixer in a conventional manner, an intermediate frequency amplifier 12, a limiter 13, a discriminator 14, and a power amplifier 15. The power audio amplifier 15 contains a stage 16 which is shown to include an anode 17 connected to the ouput transformer 18 and thence to the loudspeaker 19.

The selector circuit 20 includes an input amplifier 21 connected to the output of discriminator 14, the amplifier 21 applying the output of the discriminator sufficiently amplified through connections 22, 23 and 24 to coils 25, 26 and 27 whereby reeds 28, 29 and 30 are vibrated at resonance by the respective frequencies $f_1$, $f_2$ and $f_3$. Each connections 22, 23 and 24 may or may not include a by-pass filter for the respective frequencies $f_1$, $f_2$ and $f_3$. The reeds being resonant at the respective frequencies ordinarily make the inclusion of filters unnecessary.

Associated with the reeds 28, 29 and 30 are contacts 31, 32 and 33, the reeds and the contacts being connected in series relation in a circuit including a source of voltage 34 and a vacuum tube 35 of high amplifying characteristics, the circuit being connected through isolating resistor 36*a* to the grid 36 and the cathode 37 as indicated. The anode 38 of the vacuum tube 35 is connected through a relay coil 39 to a source of current 40. The relay coil 39 controls contact switch 41 to complete circuit 42 from the source of current 40 to transformer 18 and the anode 17 of the audio amplifier stage 15. The switch 41 is preferably of the type adapted to remain open as indicated by spring 43 when the coil 39 is deenergized. The grid-cathode circuit of the tube 35 includes a condenser 44 and a grid-leak resistance 45 to provide a desired time constant to control the period of operation of the tube 35. The time constant of these elements may be suitably selected to receive a charge of current from the battery 34 during instances of circuit closure by vibration of reeds 28, 29 and 30, the condenser-resistance combination providing an operating potential on the grid 36, for a desired interval.

In the output circuit of the vacuum tube 35 the current is sufficient to actuate relay switch 41 by energization of relay coil 39. It is preferred that the duration of receiver operation be controlled from the central station by control of the carrier frequency. This is accomplished by providing a holding circuit 46 having a relay 47 of the type to normally maintain a positive bias source B+ open except when a negative potential is applied to the tube thereof, such as may be obtained from the limiter 13 when a carrier is received. The holding circuit further includes in addition to relay contacts 48, a switch 49 controlled by the relay coil 39 and connected through an isolating resistor 50 to grid 36 so that when the relay 39 operates to close switches 41 and 49 the necessary bias potential of the proper polarity, controlled by carrier energy present in the grid-cathode circuit of the limiter 13, is applied to the grid of tube 35. Thus, when the carrier is interrupted at the central station by termination of a call, the receiver is rendered inoperative by non-conduction of tube 35 and the resulting de-energization of coil 39.

In operation, the transmitter at the central station being provided with selector 7 can send out two or more signal frequencies concurrently. These are closely controlled as to frequency. A series of push button keys 7*a* may be provided each one of which, when pushed, impresses a particular signal frequency to the modulator of the transmitter; or if desired, each key may effect transmission of a combination of signal frequencies different from other keys. The receiver in the mobile station being provided with vibratory reed elements 28, 29 and 30, each of which have a natural period of vibration differing from the other vibrating reeds, may be vibrated by transmission of the proper combination of signal frequencies.

A channel frequency, modulated with three signal frequencies, is received in the antenna system 8 and passed through the receiver up to and including the discriminator 14. After demodulation, these frequencies are amplified sufficiently by amplifier 21 to excite coils 25, 26 and 27. The reeds being arranged in series relation, electrically, complete the circuit shortly after excitation. That is, since the frequencies differ there will be a time when all three contacts 31, 32 and 33 are engaged simultaneously to complete the circuit. When this condition exists current is fed to condenser 44 and resistor 45, and a voltage is fed to the grid 36 of vacuum tube 35.

The application of voltage to the grid 36 of amplifier tube 35 provides a voltage condition which produces conduction in the tube, thereby producing the necessary current in relay coil 39 to close contacts 41 and 49. The completion of circuit 42 by closure of switch 41 provides the anode current for the audio amplifier 15 thereby rendering the receiver operative for reception of voice signals from the central station. The conduction of tube 35 is maintained by the provision of a positive bias on grid 36 by means of the holding circuit 46. When the carrier is interrupted at the central station, the bias voltage of holding circuit 46 is removed by the opening of relay contacts 48 thereby deenergizing coil 39, whereby switch contacts 41 and 49 open.

If it is desirable to communicate with all mobile stations simultaneously, "All Stations" key 51 is actuated at the central station for transmission of a particular signal frequency, such as $f_4$, for example. Each receiver includes a vibratory element 52 which is resonant at this particular frequency and which vibrates completing the circuit 53 for application of a positive bias from battery 34 to the grid 36, thereby rendering tube 35 conductive and relay coil 39 energized to place the receiver into operation as hereinbefore described. The reed 52 has associated therewith an exciting coil 54 connected to amplifier 21.

Thus, according to my system a central station may call a field station into operation for communication with the central station, and hold it in operation until the operator at the central station terminates the call by interruption of the carrier frequency. In other words, the operator controls the receiver as an operative device, calling the receiver into operation, controlling the duration of operation and, by interrupting the carrier frequency, renders the receiver inoperative. The predetermined signal frequency combinations, of course, are selected different for each station, and are so selected as to avoid erroneous signals by the occurrence of beat frequencies corresponding to any of the chosen signal frequencies. If desired, a group of receivers may be called for simultaneous reception of a given message. This can be effected by transmitting all of the signal frequencies required by the selector circuits of the receivers to be called. If all receivers are desired, by transmission of a single predetermined signal, all receivers are rendered operative at the same time.

It should be understood that the invention is not limited to the particular arrangement shown, but that other modifications and variations may suggest themselves in particular instances. For example, the single coil may replace coils 25, 26, 27 and 54. The separate coils for the different reeds are preferred, however, because of better operation. Although the system has been shown with four tuned reeds, it will be understood that a different number of reeds might be used if desired. Furthermore, any number of call frequencies may be provided at the central station, it being required only that there be a sufficient number for all the call stations; and for proper selectivity, the combination of call-reeds should differ among the stations. Also the frequencies selected for call purposes should be such that the beat frequencies produced by the combination of frequencies for one call signal will not provide in combination therewith an erroneous call signal for another receiving station.

I claim:

1. In a system for rendering a receiver operative in response to a carrier modulated with a given plurality of different signal frequencies; a receiver, control means associated with said receiver to render said receiver operative, a plurality of contacts, a plurality of vibratory elements each arranged adjacent to, and adapted upon vibration to make intermittent contact with, at least one of said contacts, each of said elements being tuned and responsive to one of said signal frequencies, a control circuit connecting said elements and said contacts in series and responsive to the simultaneous closure of said contacts to actuate said control means, electromagnetic means for vibrating said elements, and means simultaneously impressing said electromagnetic means with said signal frequencies.

2. In a system for rendering a device operative in response to a carrier modulated with a given plurality of different signal frequencies; a plurality of contacts in series, a plurality of vibrating elements each tuned and responsive to one of said frequencies and adapted upon vibration thereof to intermittently close its associated one of said contacts, electromagnetic means for vibrating said elements, a relay to control operation of said device, a control circuit actuated in response to simultaneous closure of said contacts to actuate said relay and thereby render said device operative, means to simultaneously impress said electromagnetic means with said signal frequencies, a holding circuit closed by actuation of said relay to hold said relay in actuated condition in response to said carrier, said holding circuit including a second relay having a switch in series therein and means responsive to said carrier for controlling the operation of said second relay.

3. In a system for rendering a device operative in response to a carrier modulated with a given plurality of different signal frequencies; a plurality of contacts in series, a plurality of vibrating elements each tuned and responsive to one of said frequencies and adapted upon vibration thereof to intermittently close its associated one of said contacts, electromagnetic means for vibrating said elements, a relay to control operation of said device, a control circuit actuated in response to simultaneous closure of said contacts to actuate said relay and thereby render said device operative, means to simultaneously impress said electromagnetic means with said signal frequencies, a holding circuit closed by actuation of said relay in actuated condition in response to said carrier, said relay including a first switch in series in said holding circuit closed by the acutation of said relay, a second relay including a second switch in series in said holding circuit and means responsive to the reception of said carrier for controlling said second relay to cause said second switch to close and in the absence of said carrier to actuate said second relay to open said second switch and thereby break said holding circuit.

GILBERT G. BROWN.

REFERENCES CITED

The following references are of record in the file of this patent:

UNITED STATES PATENTS

| Number | Name | Date |
|---|---|---|
| 1,608,969 | Webbe | Nov. 30, 1926 |
| 1,804,526 | Coxhead | May 12, 1931 |
| 2,124,410 | Cockrell | July 19, 1938 |
| 2,165,800 | Koch | July 11, 1939 |
| 2,173,154 | Bernard | Sept. 19, 1939 |
| 2,231,806 | Goldsborough | Feb. 11, 1941 |
| 2,321,651 | Carway | June 15, 1943 |
| 2,325,829 | Boswau | Aug. 3, 1943 |
| 2,397,088 | Clay | Mar. 26, 1946 |
| 2,431,167 | Byrnes | Nov. 18, 1947 |